Figure 1:
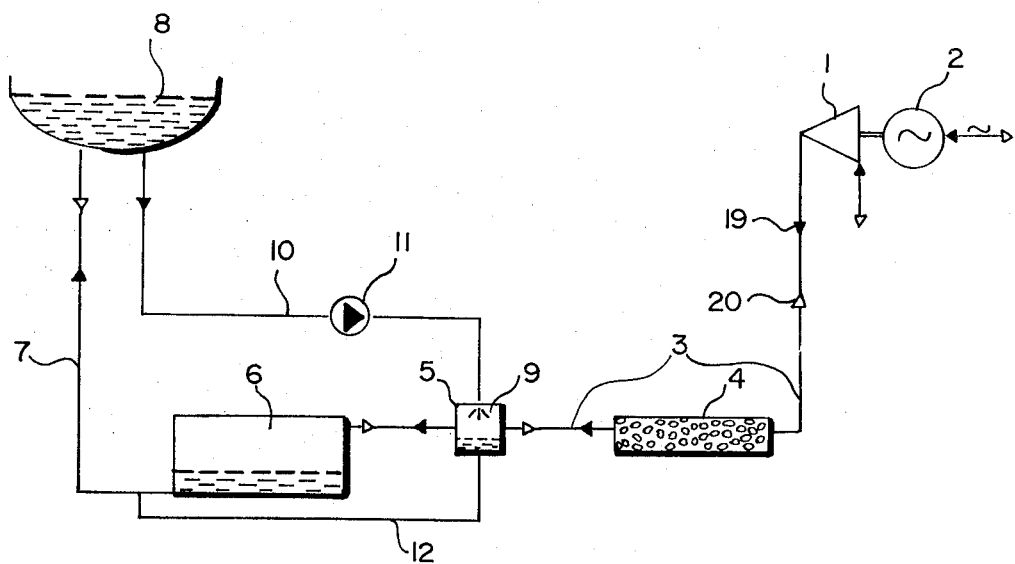

United States Patent [19]
Margen

[11] 3,872,673
[45] Mar. 25, 1975

[54] ACCUMULATION POWER STATION

[75] Inventor: Peter Heinrich Erwin Margen, Nykoping, Sweden

[73] Assignee: Aktiebolaget Atomenergi, Stockholm, Sweden

[22] Filed: Feb. 1, 1973

[21] Appl. No.: 328,687

[30] Foreign Application Priority Data
Feb. 10, 1972 Sweden................................ 1612/72

[52] U.S. Cl....................... 60/650, 60/398, 60/408, 415/500
[51] Int. Cl........................ F01b 29/04, F01k 25/02
[58] Field of Search............ 60/59 T, 371, 408, 398, 60/325, 650; 415/500

[56] References Cited
UNITED STATES PATENTS

| | | | |
|---|---|---|---|
| 2,454,058 | 11/1948 | Hays..................................... | 60/398 |
| 2,471,476 | 5/1949 | Benning et al...................... | 60/59 T |
| 2,714,289 | 8/1955 | Hofmann............................. | 60/59 T |
| 2,962,599 | 11/1960 | Pirkey............................. | 415/500 X |
| 3,218,807 | 11/1965 | Berchtold et al.................. | 60/59 T |
| 3,372,645 | 3/1968 | Willi................................ | 415/500 X |
| 3,677,008 | 7/1972 | Koutz.................................. | 60/59 T |

*Primary Examiner*—Edgar W. Geoghegan
*Attorney, Agent, or Firm*—Toren, McGeady and Stanger

[57] ABSTRACT

In an accumulation power station comprising an electric motor, an air compressor driven by the motor, a storage space for the compressed air generated by the compressor, an air turbine which is driven during peak-load periods by compressed air from the storage space, and an electric generator driven by the air turbine there is provided a regenerative heat exchanger which accumulates the heat produced when air is compressed while the compressed air storage space is being charged, and which gives off the accumulated heat to the compressed air when the compressed air storage space is being discharged.

6 Claims, 3 Drawing Figures

PATENTED MAR 25 1975  3,872,673

ACCUMULATION POWER STATION

In gas turbine power plants including a compressor it is known to arrange an underground storage space to accumulate the compressed air which the compressor can pump in during the night. During the day the accumulated compressed air is supplied to chambers having oil heaters where it is heated, subsequently expanding in and driving a turbine. Since there is no need to sacrifice power during the day to drive the compressor, the net output of electric power is increased during this time, making the station more economic.

The present invention relates to a similar type of power plant where, however, chemically bound energy is not supplied. The advantage with this is that neither oil nor gas are burned, thus avoiding problems of air pollution as well as the high costs of the relatively expensive types of oil or gas which would be required for a combustion turbine. The invention aims at retaining the high rate of power generation per kg gas of the gas turbine by making use of a high gas temperature at the inlet of the air turbine, and also at keeping the volume of the air store small at the most economical price for a specified power generation. This is done primarily by the storage of cold air in the storage space. Since air is cooled during expansion in a turbine, the intention is also to prevent the air from becoming so cold before it reaches the outlet of the turbine that there is a risk of it condensing and then freezing. Finally, the intention is to decrease the environmental problems which would arise if considerable quantities of heat had to be led away to a cooling water system.

The accumulation power plant according to the invention is characterized by a regenerative heat exchanger which, when the compressed air store is being charged, collects and stores the heat produced during compression of the air and returns the stored heat to the compressed air when the compressed air store is being discharged.

The air compressor and the air turbine may consist of separate machines, but it is also possible to use one machine which operates alternately as compressor and as turbine. Similarly, the electric motor and the generator may either consist of separate machines or comprise a single machine which can be used for both functions.

A cooler is preferably arranged between the regenerative heat exchanger and the compressed air store, which cools the compressed air while the store is being charged, but which is disconnected while the stare is being discharged. The cooler removes the extra heat supplied to the process due to losses in the turbine and the compressor. The cooler need only effect a reasonable decrease in the temperature of the compressed air and it may therefore operate by spraying water directly into the compressed air without its content of steam becoming too high. The cooling water is preferably taken directly from the store of water used to regulate the effective volume of the compressed air store.

Figure 2:
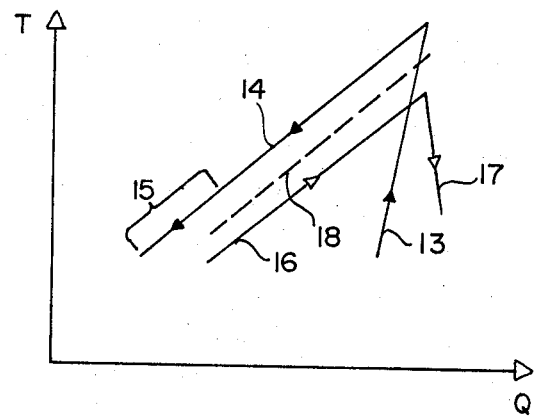

In the following the invention will be further explained with reference to the accompanying drawings in which FIG. 1 shows an accumulation power plant according to the invention, and FIG. 2 shows a temperature (T) and heat (Q) diagram.

The power plant comprises a compressor 1, which can also be run as an air turbine, and which is connected to an electric motor 2, which can also be run as an electric generator. The compressor 1 is in communication with a compressed air store 6 through a conduit 3, this store comprising a rock chamber. A regenerative heat exchanger 4 and a cooler 5 are arranged in the conduit 3. The heat exchanger 4 comprises a chamber containing stones, bricks or the like having such a mass that they can store heat contained in the compressed air flowing therethrough during a period of charging the compressed air store 6, usually at night. The cooler 5 consists of a chamber containing spray means 9 to spray water directly into the compressed air passing through the cooler. The cooling water is supplied through a conduit 10 with the help of a pump 11, from a store of water 8 which may comprise a natural or an artificial lake. The water store 8 communicates with the compressed air store 6 through a conduit 7. The water from the cooler 5 is drained to the conduit 7 through a drainage pipe 12.

The accumulation power plant illustrated operates in the following manner. In order to make the drawing easier to understand the flows in the conduits are indicated by arrows of two types, i.e., filled in arrows 19 showing the flow direction when the compressed air store 6 is being charged, and outlined arrows 20 showing the flow direction when the compressed air store is being discharged.

When there is a surplus of electric power, for example during the night, the motor 2 drives the compressor 1. The compressed air generated, which has been heated considerably due to the compression, to about 600°C, for example, if the pressure in the store is 40 bar, is led through the conduit 3 and the heat store 4, whereupon the stone, brick or the like in the heat store is heated.

At the end of the heating period, therefore, the side of the heat exchanger 4 which is nearest the compressor in the direction of flow reaches a temperature of about 600°C and the other side reaches a temperature of slightly over 100°C.

The compressed air leaving the heat exchanger is still too hot (over 100°C) to be directly led into the compressed air store 6, and the remaining heat is therefore removed by water being sprayed in the cooler 5. The specific volume of the air is thus reduced and more air can be stored in an air storage space of a certain volume. As the compressed air fills the storage space 6, the water level in this storage space drops since a volume of water corresponding to that of the compressed air is pressed through the conduit 7 up to the water store 8. The pressure in the store 6 will therefore remain substantially constant.

During periods when electric power is required, water from the water store 8 runs through the conduit 7 to the compressed air store 6. A corresponding quantity of air is pressed out through the cooler 5, and the heat exchanger 4 where the compressed air is now heated and the filler material cooled, and on through the conduit 3 to the machine 1 which is now driven as an air turbine. The turbine drives the machine 2 which now operates as an electric generator. Since the air is heated as the filler material in the heat exchanger is cooled, the temperature of the air supplied to the turbine decreases from around 580°C, for example, at the start of the electricity generating period to 520°C, for example, at the end of the electricity generating period.

In FIG. 2, T and Q indicate temperature and heat, respectively. FIG. 2 shows how the air is cooled or heated, respectively, during the different stages of a 24-hour cycle. During the period when there is a surplus of electricity - night-time, filled-in arrows - the air in the compressor is heated according to line 13 and is then cooled in the store according to line 14. In other words, heat is transferred to the filler material of the store which, in relation to the air particles, will maintain a temperature according to the line 18. The last part of the cooling process - shown within the bracket 15 - is effected by the cooler 5. The air then reaches the store at approximately atmospheric temperature. During the period when electricity is required - electricity generation day-time, outlined arrows - the outgoing air is heated as it passes through the filler material of the store by means of heat transmission along the line 16. The corresponding temperature in the store can be seen just above, on line 18. The temperature of the stones in the store drops. The air expands in the turbine and its temperature drops, line 17. The incline of line 13 during compression and line 17 during expansion is caused by vane losses in the compressor or turbine, respectively.

For an accumulation power station according to the invention, a total efficiency - i.e., the quantity of electric power generated and retrieved during a period when electricity is required divided by the amount of electric power supplied to the machine during a period of excess electricity - of about 70 percent may be expected.

Before starting to charge the compressed air store, the motor 2 must be synchronized with the mains electricity, either with the help of separate electric synchronising equipment - for example a small auxiliary turbine - or by driving the compressor 1 by connecting it to another unit in the same power plant, this second unit being driven as an air turbine during the synchronization period.

In order to increase the pressure in the store - or in order to make use of an air storage space located at a reasonable depth - a reversible pump/turbine may also be connected in the conduit 7. The pressure in the store is thus increased to a value higher than that corresponding to the static pressure due to the water column, a technique which is described for air storage power plants in Swedish Pat. application No. 10632/71 now Swedish Pat. No. 355,634.

The circuit may also be supplemented in other ways, for example by means of a heat exchanger between the still slightly heated air leaving the turbine and the cold, compressed air leaving the store.

The following is a variation of the technical equipment which falls within the scope of the present invention. The object of the water store 8, as described in the text and illustrated in FIG. 1, is to achieve approximately constant pressure in the compressed air store during charging and discharging operations. However, it is possible to construct the power plant in question without this water store. In this case the air pressure is permitted to increase gradually during the charging period, for example from 20 to 40 bar, thus doubling the quantity of air stored in the space. The air pressure is then permitted to gradually decrease to 20 during the discharging period so that half the quantity of air is used.

What is claimed is:

1. Accumulation power station comprising an electric motor, an air compressor driven by the motor, a storage space for the compressed air generated by the compressor, an air turbine which is driven during peak-load periods by compressed air from the storage space, and an electric generator driven by the air turbine, characterized therein by a regenerative heat exchanger which accumulates the heat produced when air is compressed while the compressed air storage space is being charged, and which gives off the accumulated heat to the compressed air when the compressed air storage space is being discharged, and a cooler for the compressed air arranged between the heat exchanger and the compressed air storer.

2. Accumulation power station according to claim 1, characterised in that the cooler (5) comprises spray means (9) so that water can be sprayed directly in.

3. Accumulation power station according to claim 1, characterised in that the cooler (5) has a supply conduit (10) for cooling water from the water store (8).

4. Accumulation power station comprising an electric motor, an air compressor driven by the motor, a storage space for the compressed air generated by the compressor, an air turbine which is driven during peak-load periods by compressed air from the storage space, and an electric generator driven by the air turbine, characterized therein by a regenerative heat exchanger which accumulates the heat produced when air is compressed while the compressed air storage space is being charged, and which gives off the accumulated heat to the compressed air when the compressed air storage is being discharged, a store of water communicating with the store of compressed air in order to regulate the effective volume of the store of compressed air, and a cooler for the compressed air arranged between the heat exchanger and the compressed air storer.

5. Accumulation power station according to claim 4, characterised in that the cooler (5) comprises spray means (9) so that water can be sprayed directly in.

6. Accumulation power station according to claim 4, characterised in that the cooler (5) has a supply conduit (10) for cooling water from the water store (8).

* * * * *